United States Patent
Bott et al.

[11] Patent Number: 5,785,908
[45] Date of Patent: Jul. 28, 1998

[54] PROCESS FOR ELECTRICALLY CLAMPING MOLDS TO PLATENS

[75] Inventors: James A. Bott, Waterford; John Tarr, Goodrich, both of Mich.

[73] Assignee: Incoe Corporation, Troy, Mich.

[21] Appl. No.: 813,519

[22] Filed: Mar. 7, 1997

Related U.S. Application Data

[62] Division of Ser. No. 254,198, Jun. 6, 1994, Pat. No. 5,643,613.

[51] Int. Cl.⁶ .................................................. B29C 45/64
[52] U.S. Cl. .................. 264/40.5; 264/219; 264/328.1; 425/150; 425/162; 425/185; 425/192 R
[58] Field of Search ................ 264/40.1, 40.5, 264/40.7, 219, 328.1; 425/185, 192 R, 195, 135, 136, 138, 150, 162, 451.9, 595

[56] References Cited

U.S. PATENT DOCUMENTS

| | | | |
|---|---|---|---|
| 3,353,221 | 11/1967 | Barnett et al. | 425/451.9 |
| 3,356,130 | 12/1967 | Mellen, Jr. et al. | 425/162 |
| 3,465,386 | 9/1969 | Brown | 425/DIG. 221 |
| 3,729,283 | 4/1973 | Eggenberger et al. | 425/451.2 |
| 4,535,689 | 8/1985 | Putkowski | 425/451.7 |
| 4,540,359 | 9/1985 | Yamazaki | 425/157 |
| 4,781,568 | 11/1988 | Inaba | 425/451.7 |
| 4,938,682 | 7/1990 | Kadoriku et al. | 425/451.7 |
| 4,976,602 | 12/1990 | Yamazaki | 425/DIG. 221 |
| 5,234,332 | 8/1993 | Hoenke et al. | 425/451.9 |
| 5,282,732 | 2/1994 | Eggert | 425/188 |
| 5,362,222 | 11/1994 | Faig et al. | 425/589 |
| 5,536,159 | 7/1996 | Yamamura et al. | 425/150 |

FOREIGN PATENT DOCUMENTS 2082945  3/1982  United Kingdom ............ 425/451.9

*Primary Examiner*—Jill L. Heitbrink
*Attorney, Agent, or Firm*—Brooks & Kushman

[57] ABSTRACT

An electric mold clamping mechanism containing a pair of clamping members is activated by an electric motor. The electric motor operates a threaded piston with acme threads which in turn operate a drive plate to extend and retract the clamping members. The clamping members are used to hold a mold plate in an injection molding machine. The clamping members are pivotally attached to a drive plate mechanism and have a surface which mates with a wedge cam to force the clamping member against the mold plate. The stroke of the clamping mechanism is regulated by an amperage draw on the electric motor. A limit switch is used to terminate the end of the retracting stroke. An indicator light is used to indicate the clamping position of the device.

2 Claims, 5 Drawing Sheets

PROCESS FOR ELECTRICALLY CLAMPING MOLDS TO PLATENS

This is a divisional of application Ser. No. 08/254,198 filed on Jun. 6, 1994, now U.S. Pat. No. 5,643,613.

TECHNICAL FIELD

The present invention relates to clamping of molds in injection molding machines and more specifically to an electric system for automatically clamping the molds in the machine.

BACKGROUND OF THE INVENTION

In many years, improvements have been made to make plastic injection molding faster and more automatic. Simplifying and decreasing the time required to change molds results in greater productivity and a reduction in labor expense.

One system in use today utilizes a hydraulic mold clamping process and a system for quickly withdrawing a mold from an injection molding machine and inserting another in its place. The hydraulic method of clamping the mold involves hydraulically actuated wedge-lock clamps. The clamps are mounted on the two platens and utilizes a extendible and retractable clamping block and a hydraulic piston assembly. The hydraulic system has drawbacks relative to possible oil contamination, difficulties in installation and difficulties in interfacing with the machine's control system.

SUMMARY OF THE INVENTION

The present invention provides an electric mold clamping apparatus and method for an injection molding system which is an improvement over known systems. A plurality of locking clamps are mounted on the fixed and moving platens of the injection molding machine. The clamping devices are mounted either in the horizontal or vertical directions, depending on whether the molds are to be side loaded or top loaded in the injection molding machine.

Each of the clamping devices includes an electrically operated piston and a pair of wedge-lock clamping members. The clamping members have an outwardly and downwardly pivoted motion and act to wedge lock the mold in the injection molding machine. An acme type thread is used to lock the clamping member in the clamped position. The clamping force is not reduced by any loss of electricity. A signal light is provided to indicate locking and unlocking of the clamping members.

The extension and thus the clamping of the clamping members is determined by a predetermined amperage draw, or an equivalent process. The present invention is simpler and less costly and time consuming to install and operate than comparable hydraulic systems.

It is an object of the present invention to provide a mold clamping system which is simpler and less expensive to install than known systems. It is another object of the present invention to provide an automatic mold clamping system for injection molding machines which is simpler and less expensive to operate than known systems.

It is still another object of the present invention to provide an automatic mold clamping system which utilizes an electrical operating system, rather than an hydraulic operated system. It is a still further object of the present invention to provide an automatic mold clamping system in which the clamping force is not reduced by a loss of electrical power and the clamping force is determined by an amperage draw.

These and other objects, features and advantages of the present invention will become apparent from a review of the following specification and appended claims, when viewed in accordance with the accompanying drawings.

BEST MODE(S) FOR CARRYING OUT THE INVENTION

Figure 1:
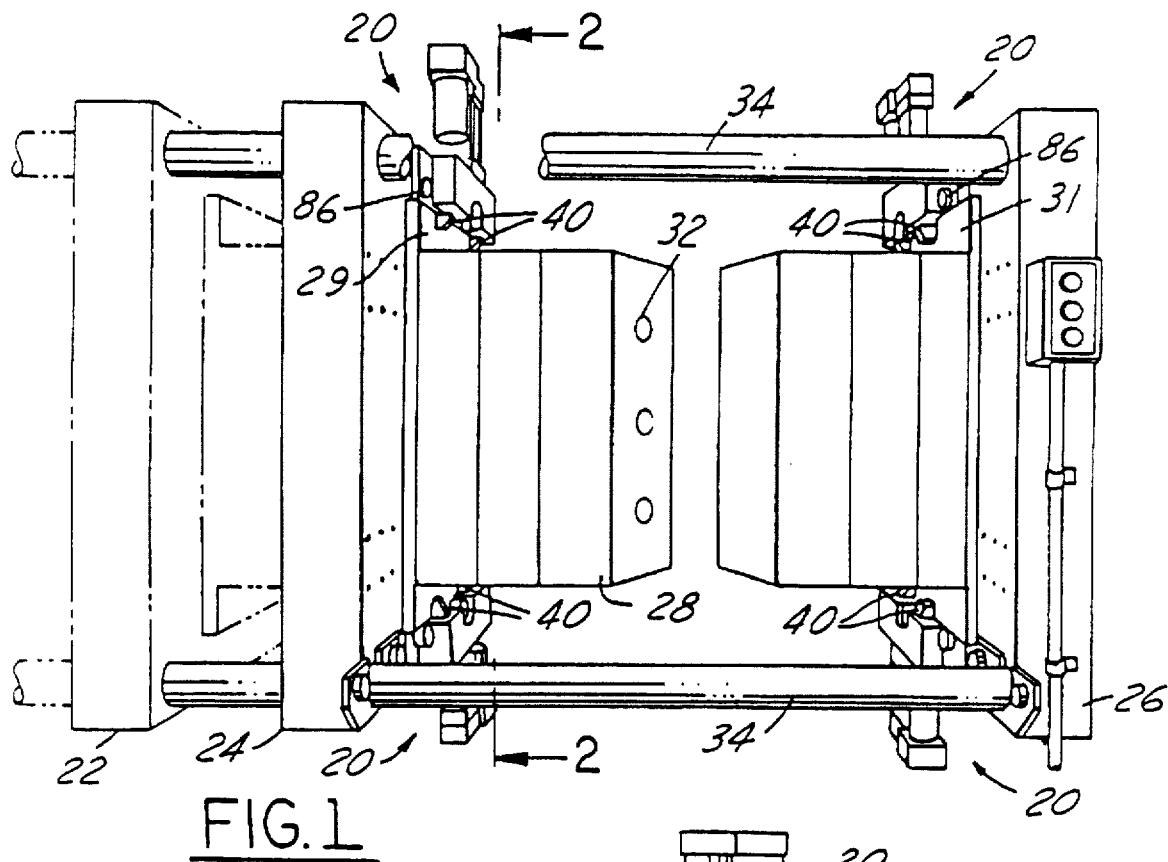
FIG. 1 illustrates the use of the present invention in an injection molding system.
Figure 2:
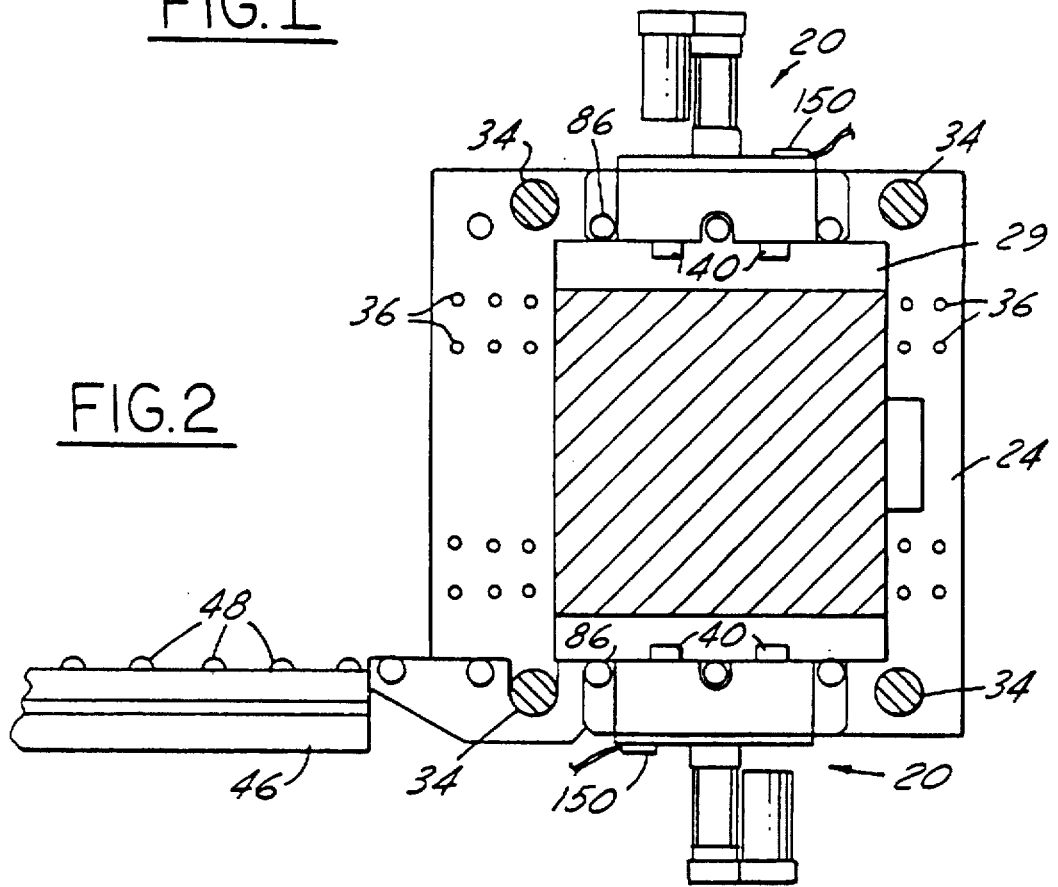
FIG. 2 is a cross-sectional view of the use of the invention as shown in FIG. 1, the view being taken along lines 2—2 in FIG. 1 and in the direction of the arrows.
Figure 3:
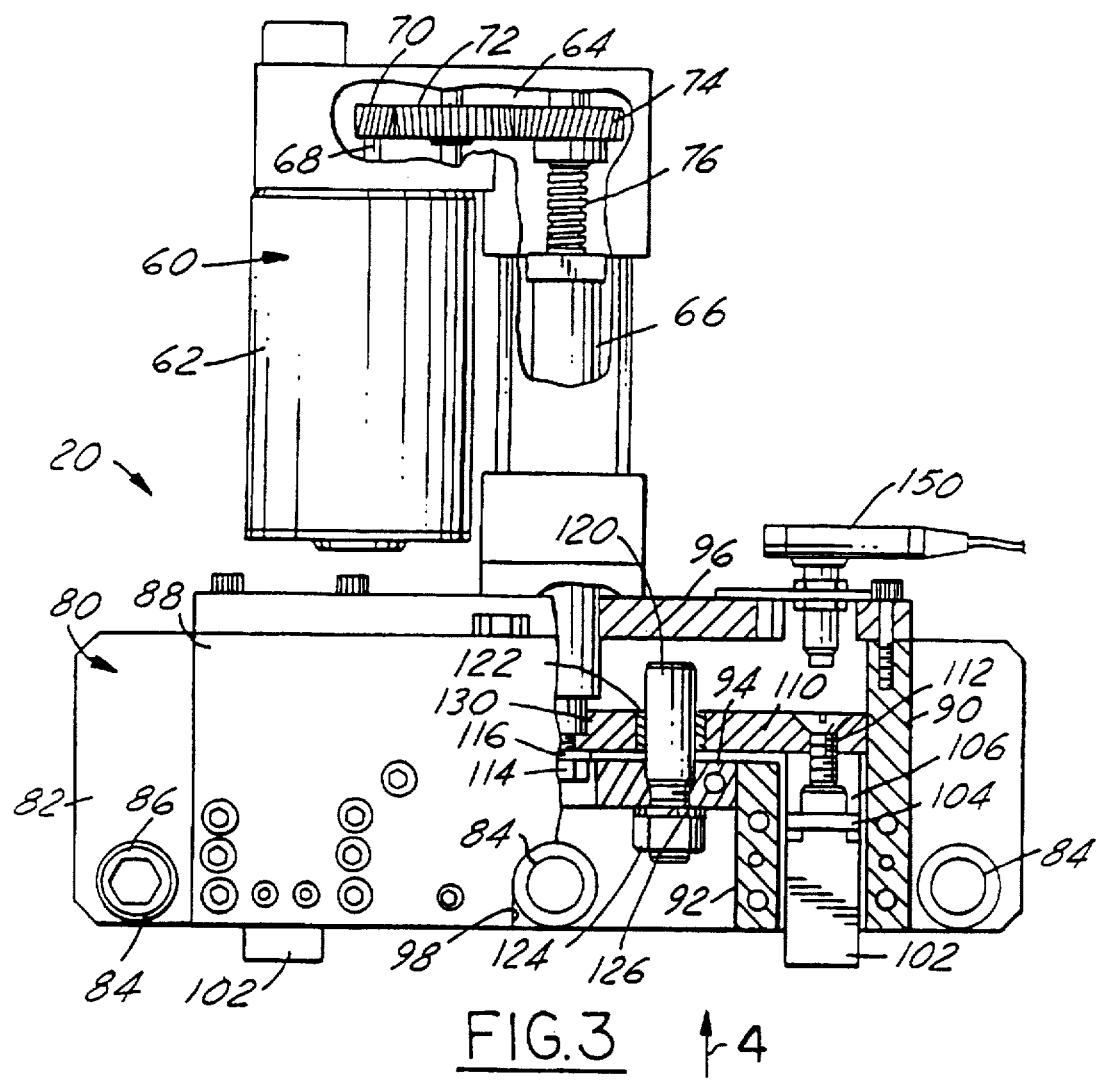
FIG. 3 is a top elevational view of an electric molding clamping device in accordance with the present invention.
Figure 4:
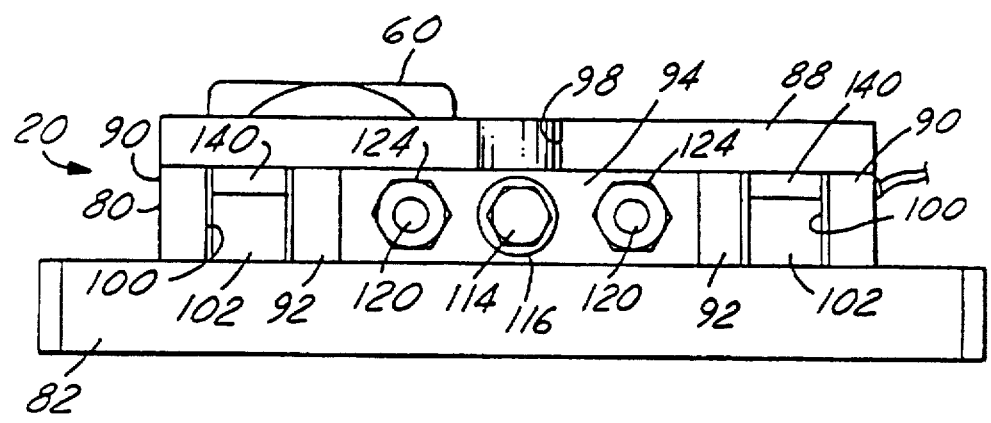
FIG. 4 is a front elevational view of the clamping device as shown in FIG. 3, taken in direction of the arrows 4—4 shown in FIG. 3.

The automatic mold clamping devices in accordance with the present invention are referred to by the numeral 20 in the drawings. As shown in FIGS. 1 and 2, the clamping devices in accordance with the present invention can be used with any conventional injection molding machine, a part of one of which is generally designated by the numeral 22 in FIG. 1.

Injection molding machines are used to inject molten plastic materials into mold cavities under significant pressure in order to form plastic molded products. FIGS. 1 and 2 generally denote a conventional injection molding machine and the operation thereof, and it is understood that the present invention is not limited to any specific type or model of injection molding machine.

As shown in FIGS. 1 and 2, injection molding machine 22 has a pair of platens, a movable platen 24 and a fixed platen 26. The two halves 28 and 30 of the mold are shown mounted on the platens. The mold 30 typically has one or more injection molding bushings inside of it (not shown) which are connected either directly or through a manifold/runner system to an injection nozzle which injects plastic material into the mold. The mold plate 28 normally has one or more cavities 32 therein which are used to form the finished plastic injection molded part(s).

Tie bars 34 are used to maintain the operation and orientation of the platens 24 and 26. One of the platens 24,26 typically moves on the tie bars 34 when they are operated by the injection molding machine and the other platen typically allows the rods to pass through allowing the mold halves 28,30 to close and be tightly pressed together.

A series of conventional threaded mounting openings 36 are contained in rows on the faces of the platens 24,26. With most known injection molding systems, the mold halves 28,30 are secured to the platens 24,26 with large bolts and clamping members, the bolts being threaded into openings 36. The bolts 36 tightly hold the clamping members (not shown) against the mold halves 28,30 holding them tightly in place against the platens 24,26. For this purpose, the mold halves 28,30 have extending flanges 29,31, respectively, which allow ease of clamping and securing of the mold parts to the platens.

As shown in FIGS. 1 and 2, four electric mold clamping devices 20 are used to hold the two mold halves 28,30 in place in the injection molding machine. Each of the clamping devices 20 contain a pair of clamping members 40. Thus, eight members 40 are used to hold the molds 28,30 in place in the machine 22.

The mold clamping system shown in FIGS. 1 and 2 uses a side-loading system for loading and unloading the mold halves 28,30 in the injection molding machine 22. The four clamping devices 20 are mounted vertically on the platens 24,26 and the mold halves 28,30 are inserted and removed from the machine horizontally from the side.

In this regard, FIG. 2 illustrates the use of a frame 46 with a plurality of rollers 48 adjacent the bottom of the platen 24 which allows mold half 28 to be easily rolled into and out of the injection molding machine 22 when it is not secured to the platen. If desired, the frame 46 can be positioned on a table or cart and thus be used to transport the mold halves 28,30 once they are removed from the machine.

Figure 9:
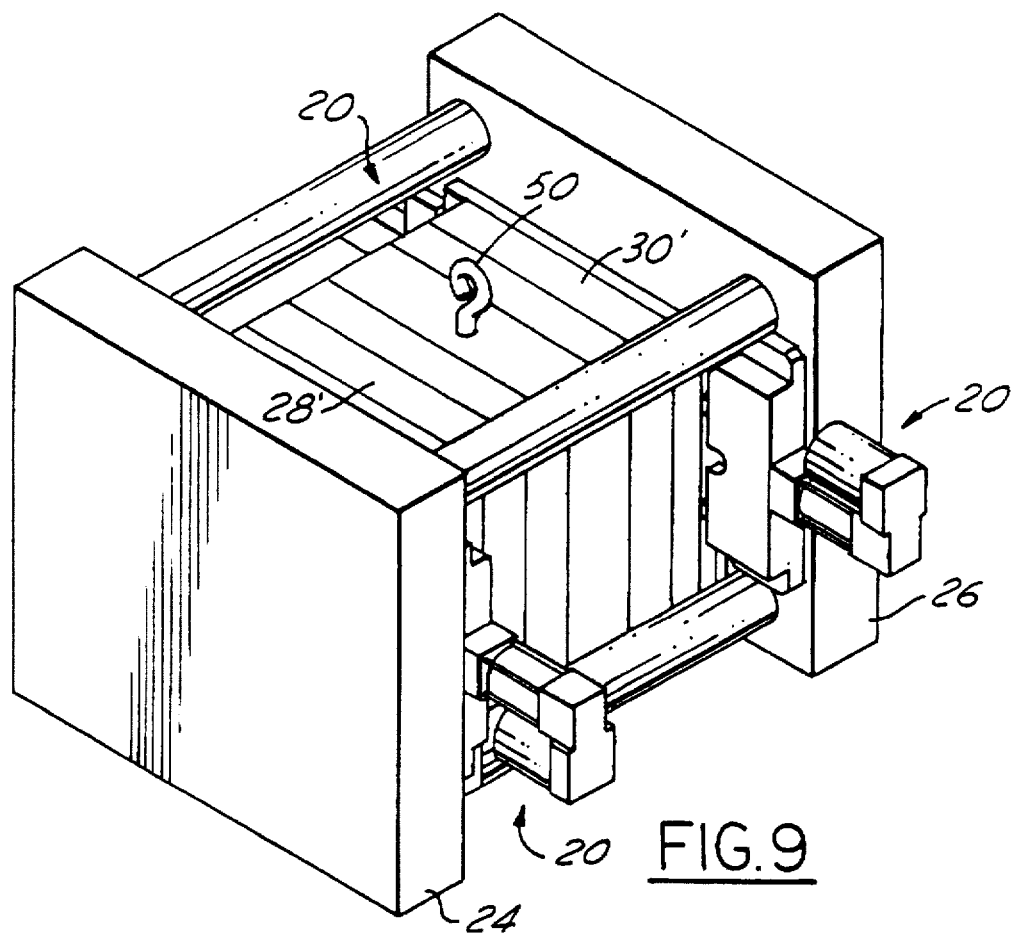
FIG. 9 illustrates an alternate use of the present invention.

FIG. 9 shows an alternative way of mounting the mold halves 28',30' in the platens 24 and 26 of the injection molding machine. In this system, the mold halves are loaded vertically from the top of the machine using an overhead crane or the like. In this top-loading system, four clamping devices 20 are again utilized, but they are mounted horizontally on the platens 24,26. A hook or similar device 50 is used to assist in the removal of the mold halves 28' and 30' from the machine.

FIGS. 3–8 illustrate the structure and operation of the electric mold clamping devices 20. A motor/drive mechanism 60 is used to operate the clamping device. The mechanism 60 includes an electric motor 62 which is connected to a gear mechanism 64 and a thread-actuated piston 66. The electric motor 62 turns a shaft 68 which is connected to a drive gear 70. The drive gear 70 in turn is connected through an intermediate step-down gear 72 to a third gear 74 which is connected to threaded shaft 76 and piston 66.

Figure 10:
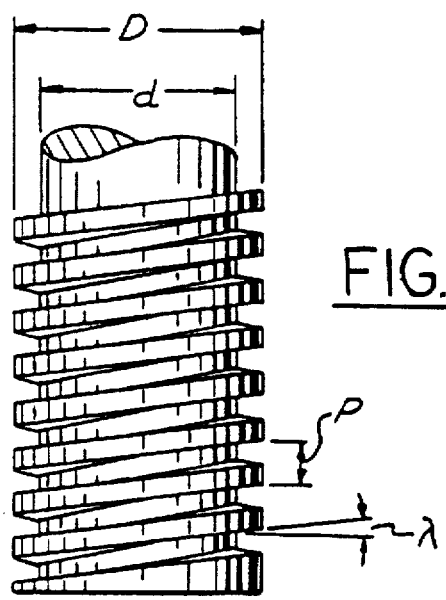
FIGS. 10 and 11 illustrate the acme threads preferably used with the present invention.
Figure 11:
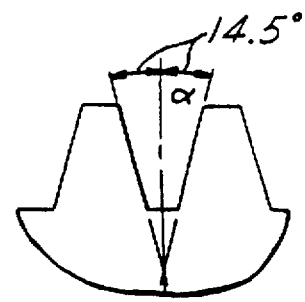

The motor 62 is preferably a 24 VDC powered motor, but can be any other conventional motor which would meet the requirements of the present invention. The threads on the threaded rod 76 are preferably acme-type threads, as shown in FIGS. 10 and 11. Acme threads are preferably utilized because they automatically lock in all positions.

With acme threads, the angle α is the thread angle and preferably is about 14.5°, while angle λ is the helix angle. $D_m$ is the mean diameter and equals $(D+d)/2$ where D is the major diameter and d is the minor diameter of the threaded rod 76. For a self locking screw, the coefficient of static friction "f" is determined as follows:

$$f \geq \frac{L \cos \alpha_n}{\pi D_m} \quad (1)$$

where L is the lead, $\alpha_n$ is the thread angle in the normal plane, and $D_m$ is the mean diameter. $\alpha_n$ also=$\tan^{-1}$ (tan α cos λ). In this regard, L equals the pitch P for a single thread and equals 2P for a double thread.

The motor/drive mechanism or assembly 60 is used to operate the clamping mechanism 80. The mechanism 80 includes a base or bottom plate 82 which is adapted to be secured directly to platens 24,26 of the injection molding machine. For this purpose, a plurality of openings 84 are provided in the bottom plate 82 so that it can be secured to the platens by bolts or machine screws 86, some of which are shown in FIGS. 1 and 2.

The clamping mechanism 80 also includes a top plate 88, a pair of outer supports 90, a pair of inner supports 92 and a center support 94. A retaining plate 96 is also provided and is used to connect the motor/drive assembly 60 to the clamping mechanism 80. A semicircular opening 98 is provided in the top plate 88 for access to the central opening 84 in the bottom plate 82.

The inner and outer supporting members 90 and 92, together with central supporting member 94 form chambers 100 in which are positioned the clamping members 40.

Clamping members 40 include clamping tongues 102 which are pivotally mounted by pins 104 to clevis yokes 106. Yokes 106 are connected in turn to a drive plate 110 by screws or other similar fasteners 112. The drive plate 110 is directly connected to the output end of the electric activated piston 66 by means of threaded nut or equivalent fastener 114. A washer 116 is also provided. A rotational movement of the threaded rod 76 and a corresponding longitudinal movement of the piston 66 in turn causes movement of the drive plate 110 and in turn the clevis yokes 106 and clamping tongues 102.

A pair of guide rods 120 are provided in each of the clamping apparatus 80 to ensure that the drive plate 110 will not cant or inadvertently lock up in some manner relative to the chambers 100 and clamping tongues 102. The guide rods 120 are mounted in bushings 122 in the drive plate 110 and are secured to the center support 94 by nuts 124 and lock washers 126. Also, for this same purpose of preventing cocking or canting of the drive plate 110, a flanged bushing 130 is provided in the opening through which the drive end of piston 66 is situated.

The guide rods 120 are positioned in the drive plate 110 with pressed bushings 122. Also, a slight clearance is provided between the flanged bushing 130 and the drive plate 110. This also compensates for slight offcentering, canting or cocking of the drive plate 110 versus the longitudinal axis of the threaded rod 76 and piston 66.

Figure 5:
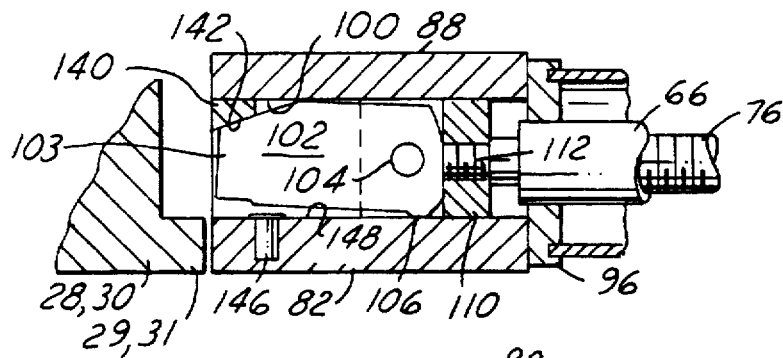
FIGS. 5–7 illustrate the operation of the wedge-lock clamping members in accordance with the present invention.
Figure 6:
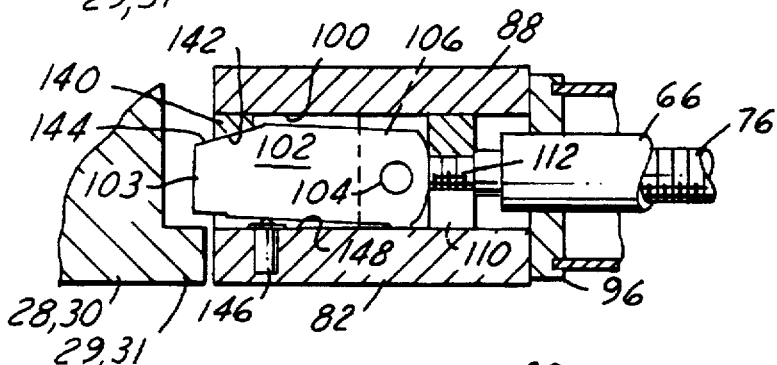
Figure 7:
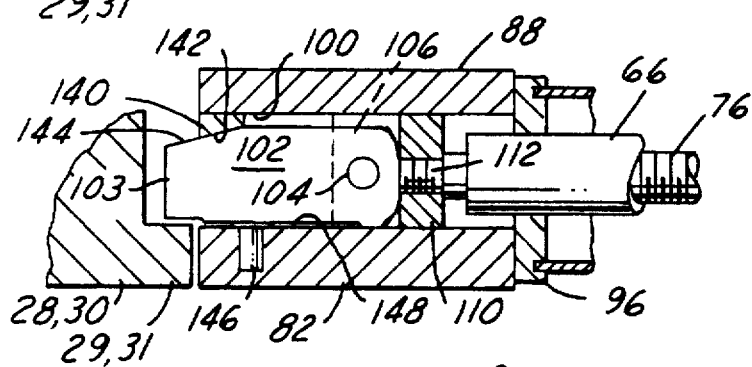
Figure 8:
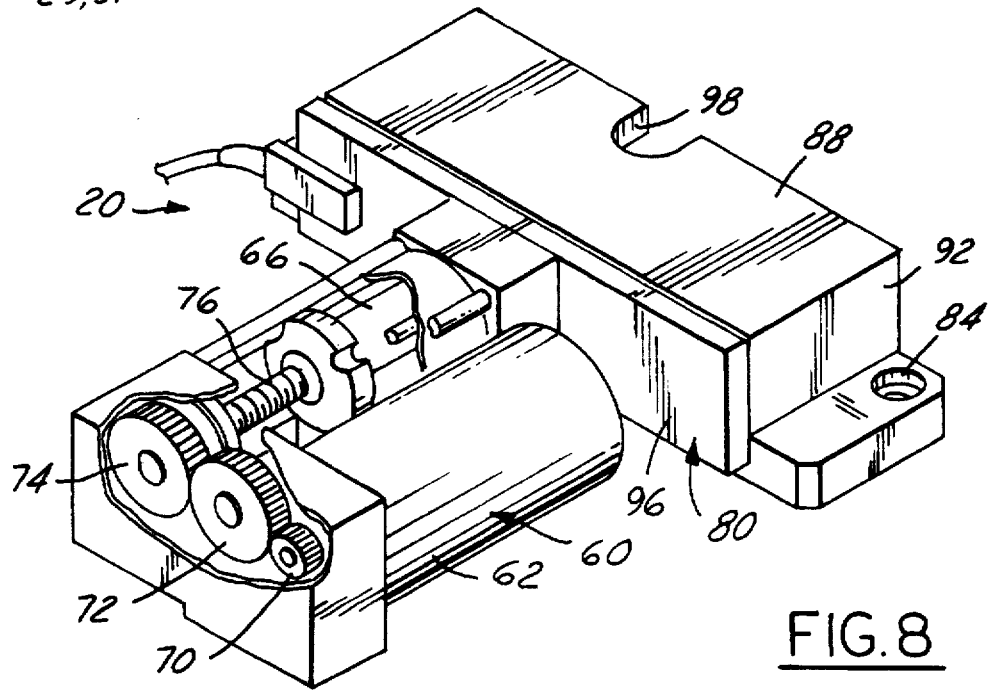
FIG. 8 is a schematic view illustrating the electric piston system for use with the present invention.

The operation of the clamping mechanism of the devices 20 is shown in FIGS. 5–7. As stated above, for purposes of clamping the mold halves 28,30 to the platens 24,26, the bottom or base plates of the mold halves have outwardly extending flanges 29 and 31 thereon.

A wedge cam 140 is provided in each of the chambers 100 in the clamping mechanism 80. The cams 140 have a radiused surface 142 which mates with a correspondingly slanted or angled surface 144 on the clamping tongues 102 which preferably is on the order of 15°. A spring-activated detent mechanism 146 is also provided in the chamber 100 and is used to bias the clamping tongue 102 away from the lower surface 148 of the chamber 100. As shown in FIG. 5, when the clamping tongue 102 is in its retracted and rest position, the detent mechanism 146 forces the clamping tongue 102 to be positioned away from the bottom of the chamber 100 and upwardly toward or against the upper portion of the chamber. Then, as the mechanism is activated and the tongue 102 begins to extend to its clamping position, the slanted surface 144 on tongue 102 comes into contact with the radiused surface 142 on the wedge cam 140. This causes the tongue 102 to rotate around pivot pin 104 and overcomes the force of the spring in the detent mechanism 146. As the clamping tongue 102 is fully extended, as shown in FIG. 7, the outer ends 103 of clamping tongues 102 come in contact with and engage the flanges 29,31 of the mold halves 28,30 and holds them tightly in their clamped position.

Due to the acme threads used with the present invention, the clamping forces are not relaxed or lost in any manner if electricity were to fail or be removed from the clamping mechanism 80. The threads lock in position and cannot be moved. In this manner, the clamping mechanisms of the present invention will not lose any clamping force in the event of an electrical failure.

To clamp the mold, the amount of extension of the clamping tongue 102 is determined by a preset amperage draw of the mechanism. When the control mechanism senses a certain amperage associated with the extension of the clamping tongue 102, a relay is energized which cuts off the power to the motor/drive assembly 60. This also activates an indicator light which shows the operator that the clamps are fully engaged.

To unclamp the mold, the switch or key (not shown) is activated which returns the clamping members 40 to their original positions. A limit switch 150 is used to mechanically sense the position of the drive plate 110 and cut off the power to the motor/drive assembly 60 when a certain position is reached. Also, at this time, the indicator light is turned off which indicates to the operator that the mold is unclamped.

Although the amperage draw technique is preferably utilized to sense and cease the operation of the motor/drive assembly, and thus limit the stroke of the clamping tongue 102, other alternatives are available. For example, a transducer which senses the pressure of the clamping tongue 102 on the mold halves 28,30 can be utilized. In the alternative, strain gauges could be used on either the clamping tongue or wedge cam which could control the stroke of the tongue based on certain preselected readings.

The present invention has a number of advantages over known hydraulic mold clamping systems. Hydraulic systems have possible oil leaks in the system and possible oil contamination of the molded parts. With the present electrically activated system, there is no possibility of oil contamination. This is particularly important in the injection molding of devices for the food and medical fields. In these areas, clean rooms are frequently used to mold the plastic devices and industry procedures and regulations are very stringent.

With hydraulic systems, only the wedge action of the clamping devices are normally used to hold the mold in place. With the present invention a wedge action is used to clamp the molds, while the acme threads are used to lock the clamps in their clamped positions.

In addition, the installation of hydraulic systems on injection molding machines is relatively slow and labor intensive, requiring a separate hydraulic unit and various hydraulic fittings. In contrast, with the present invention, separate hydraulic units and fittings are not required. The installation is easier and less costly.

The electrical system in accordance with the present invention also has the advantage that it can only operate it when the machine is in operation. The electrical circuit will not allow operation of the clamping mechanisms 20 when the injection molding machine is not in operation. Since hydraulic systems are independent of the injection molding machines, they could inadvertently be operated at an undesirable time.

In order to measure the amperage or amperage draw with the present invention, a current limiting circuit is used. A sensing wire with a predetermined resistance value is used to sense the amperage draw. The longer the wire, the greater the resistance value. The electrical circuit senses the current that the motor is drawing and monitors the amperage draw increases. When a certain prespecified amperage is reached, the motor is automatically shut off. That prespecified amperage is determined prior to initiation of the clamping process. A resistor may also be used to secure the same results.

With the present invention, the clamping tongues 102 are preferably provided in pairs or sets of two. This provides a less costly system, as well as a more efficient clamping operation than individual clamping tongues.

Figure 12:
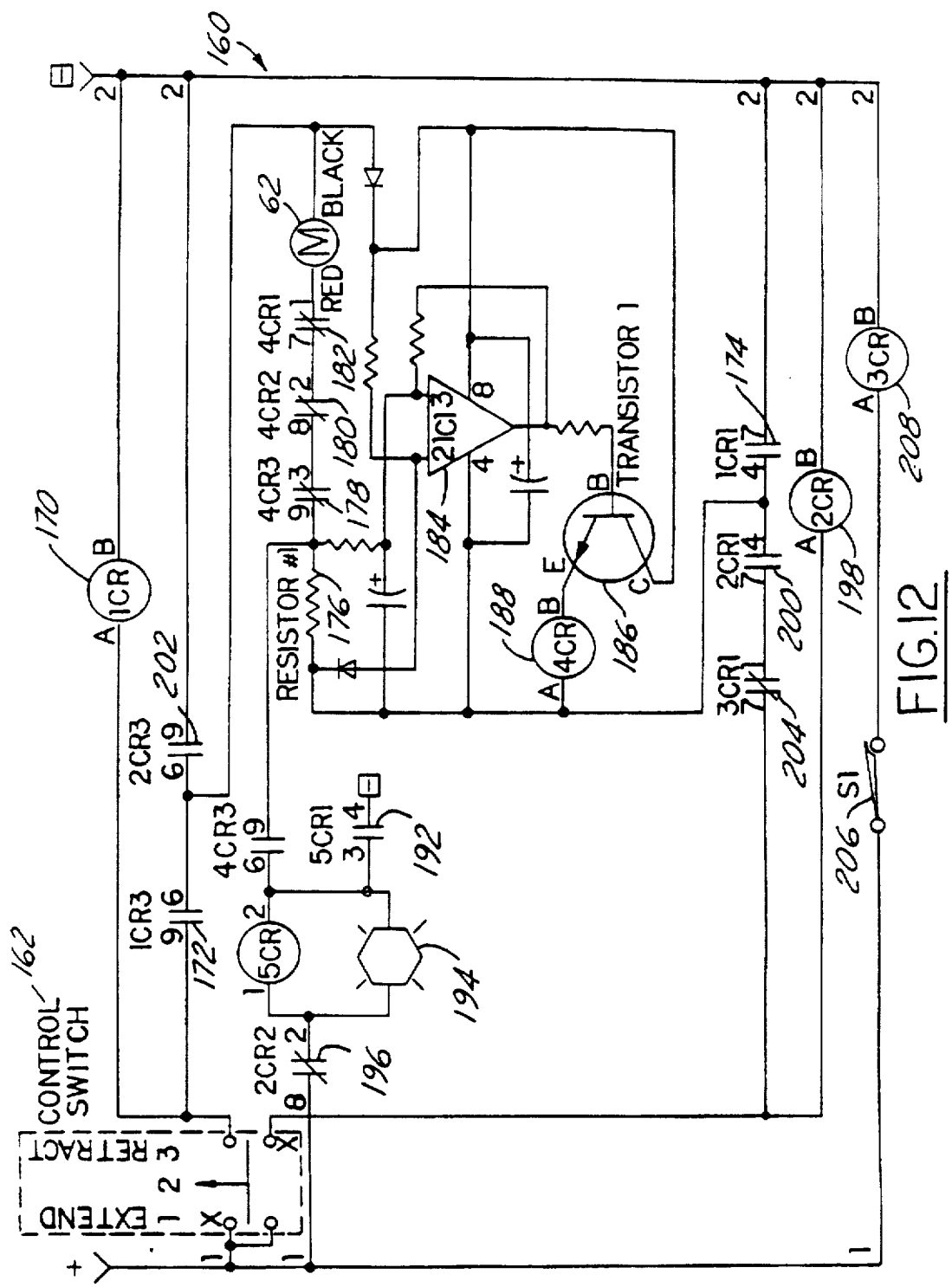
FIG. 12 is a schematic view of the preferred circuit diagram for use with the present invention.

The preferred electric circuit for use with the present invention is shown in FIG. 12. The circuit 160 is operated by a control switch 162 which preferably has three positions. First position (1) operates to extend the clamping tongues 102. Second position (2) is a neutral position. The third position (3) retracts the clamping tongue 102. When the control switch is moved to the extended position, voltage is applied to relay 1CR 170. This causes contacts 1CR3 172 and 1CR1 174 to close. When the 1CR3 contacts are closed, voltage is applied to one side of the motor 62. When the 1CR1 contacts are closed, voltage is applied through the resistor 176 and relay contacts 4CR3 178, 4CR2 180 and 4CR1 182 to the other side of the motor. These numbered relay contacts are all normally closed and apply voltage to the motor until it reaches the necessary current across resistor 176. When this happens, the output of integrated circuit IC1 184 applies a voltage to transistor 186 which turns it on. This applies power to relay 4CR 188 which opens contacts 178, 180 and 182, shutting off voltage to the motor causing it to stop.

The 4CR3 178 contacts are normally open. These contacts will close and apply voltage to relay 5CR 190, and 5CR1 192 which normally are open. When the voltage is applied to relays 190 and 192, the relays close causing illumination of light 194. This indicates to the operator that the clamp is in the extended position.

The closing of the contact 5CR1 192 connects the voltage to the relay 5CR 190. The other side of relay 5CR 190 and light 194 have voltage applied to them through contacts 2CR2 196 which are normally closed.

When the control switch 162 is in the (3) or retracted position, voltage is applied to relay 2CR 198. This causes contacts 2CR1 200 and 2CR3 202 which normally are open to close. When contact 2CR2 196 opens and voltage is removed from relay 5CR 190, the light 194 will turn off. At this time, contact 2CR1 200 which normally is open will close and apply voltage through contacts 3CR1 204 that also are normally in a closed position. At this point, voltage is applied to resistor 176 and relay contacts 178, 180 and 182 which all are normally closed to one side of the motor. Contact 2CR3 202 also closes connecting the voltage to the other side of the motor causing the clamp tongue 102 to retract. This continues until limit switch S1 206 is closed applying voltage to relay 3CR 208. The 3CR1 204 contacts which normally are closed, open at this point removing voltage from the motor and turning it off.

When the control switch 162 is in center position (2), the electric mold clamping device is not operable in either direction.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A method of clamping a mold to an injection molding machine, comprising securing a plurality of clamping devices in said molding machine, positioning said mold in said molding machine, and electrically operating an electric motor for actuating said clamping devices to secure said mold in said molding machine, monitoring the current draw of said electric motor; and determining that said mold is clamped to the molding machine when the current draw is a preselected current draw.

2. A method for clamping a mold to an injection molding machine with at least one clamping apparatus, said method comprising the steps of:

a) positioning at least one clamping apparatus in the injection molding machine;

b) positioning a mold member in said injection molding machine adjacent said clamping apparatus;

c) said clamping apparatus comprising:

i) a housing;

ii) at least one moveable clamping member in said housing and being movable between a first position within said housing to a second position wherein at least a portion thereof extends outside said housing and is used to clamp the mold to the injection molding machine;

iii) an electric motor in operative association with said housing;

iv) a drive mechanism in operable connection with said motor and used to move said clamping member between said first and second positions;

v) an electric circuit in operative association with said motor; and vi) a control system for controlling the operation of said motor, drive mechanism and clamping member;

d) operating said clamping apparatus to move said clamping member from said first position to said second position to provide a clamping force on said mold;

e) measuring the amperage drawn on said motor as said clamping member is moved; and f) limiting the movement of said clamping member toward said second position in accordance with a predetermined amperage drawn on the motor.

* * * * *